US012177192B2

(12) United States Patent
Prasad et al.

(10) Patent No.: US 12,177,192 B2
(45) Date of Patent: Dec. 24, 2024

(54) MANAGING COMMUNICATION OF SENSITIVE INFORMATION (71) Applicant: Visa Europe Limited, London (GB)

(72) Inventors: Ranjiva Prasad, London (GB); Maheswaran Virupatchan, London (GB); Vishal Gangwani, London (GB); Dean Kramer, London (GB)

(*) Notice: Subject to any disclaimer, the term of this patent is extended or adjusted under 35 U.S.C. 154(b) by 326 days.

(21) Appl. No.: 17/640,515

(22) PCT Filed: Sep. 5, 2019

(86) PCT No.: PCT/EP2019/073772
§ 371 (c)(1),
(2) Date: Mar. 4, 2022

(87) PCT Pub. No.: WO2021/043413
PCT Pub. Date: Mar. 11, 2021

(65) Prior Publication Data
US 2022/0417223 A1 Dec. 29, 2022

(51) Int. Cl.
*H04L 9/40* (2022.01)
*H04L 9/32* (2006.01)
(52) U.S. Cl.
CPC ........ *H04L 63/0414* (2013.01); *H04L 9/3213* (2013.01); *H04L 63/18* (2013.01)
(58) Field of Classification Search
CPC .................................................. H04L 63/0414
See application file for complete search history.

(56) References Cited

U.S. PATENT DOCUMENTS

| 9,064,376 | B1 * | 6/2015 | Rubin | H04L 63/145 |
| 10,897,358 | B2 * | 1/2021 | Neumann | H04L 63/08 |
| 2002/0062249 | A1 | 5/2002 | Iannacci | |
| 2016/0180368 | A1 | 6/2016 | Booth | |
| 2017/0193543 | A1 | 7/2017 | Priebatsch | |
| 2019/0180310 | A1 | 6/2019 | Jones | |

OTHER PUBLICATIONS

Application No. PCT/EP2019/073772, International Search Report and Written Opinion, Mailed on Jun. 8, 2020, 12 pages.

* cited by examiner

Primary Examiner — Simon P Kanaan
(74) Attorney, Agent, or Firm — Kilpatrick Townsend & Stockton LLP (57) ABSTRACT Disclosed herein is a computer-implemented method of managing sensitive information and the communication thereof. The method comprising: receiving, by a first server from a second server, first sensitive information relating to a user having an account with the second server; receiving, by the first server from a user device, second sensitive information via a data entry page hosted by the first server, wherein the data entry page is configured to receive second sensitive data associated with the user and the second sensitive information is different to the first sensitive information; and associating, by the first server, the first sensitive information with the second sensitive information. The first server and the second server communicate via a first communication channel and the first server and the user device communicate via a second, different communication channel.

17 Claims, 7 Drawing Sheets

MANAGING COMMUNICATION OF SENSITIVE INFORMATION

BACKGROUND

Field

The present application relates to managing communications of a networked system and, more specifically, to a server computer and a method for managing the transfer of sensitive information between multiple entities within such a system.

Description of the Related Technology

As technologies advance, the number of cashless transactions being carried out is ever increasing, which results in an increasing amount of data associated with such transactions being transferred across payment networks, often including several different entities. Typical transaction systems, that are part of such payment networks, allow a user to make a payment using a payment card or a computing device by obtaining information from the card or device and communicating details of the transaction and the obtained information to an entity within the system, such as a payment service provider, for further processing.

Certain transaction systems comprise a third party, with which the user has an account and to which communications regarding the transaction are exchanged in order to update a status of the user's account based on the details of the transaction.

It would be advantageous to improve a transaction system that exchanges a plurality of communications relating to a transaction. In addition, it would be advantageous to increase the security of the communications sent to third parties within a transaction system.

SUMMARY

According to a first aspect of the present disclosure there is provided a computer implemented method. The method comprising: receiving, by a first server from a second server, first sensitive information relating to a user having an account with the second server; receiving, by the first server from a user device, second sensitive information via a data entry page hosted by the first server, wherein the data entry page is configured to receive second sensitive data associated with the user and the second sensitive information is different to the first sensitive information; and associating, by the first server, the first sensitive information with the second sensitive information. The first server and the second server communicate via a first communication channel and the first server and the user device communicate via a second, different communication channel.

According to a second aspect of the present disclosure there is provided a server computer comprising: a processor; and a computer readable medium configured to store executable instructions, wherein the server computer is configured to communicate with a user device and a second server computer, and the processor is configured to execute the stored executable instructions to: receive, from the second server computer via a first communication channel, first sensitive information relating to a user having an account with the second server; receive, from the user device, second sensitive data associated with the user, wherein the second sensitive information is different to the first sensitive information; receive, from the user device via a second, different communication channel, second sensitive information via the data entry page; and associate the first sensitive information with the second sensitive information.

According to a third aspect of the present disclosure there is provided a system comprising a client computer, a first server and a second server, wherein the first server is configured to: interact with the second server and the client computer via respective data transfer channels; receive, from the second server via the respective data transfer channel, first sensitive information relating to a user having an account with the second server and associated with the client computer; provide a data entry page accessible by the client computer; receive, from the client computer via the respective data transfer channel, second sensitive information associated with the user via the data entry page, wherein the second sensitive information is different to the first sensitive information; and link the first sensitive information with the second sensitive information; wherein the client computer is configured to: access the data entry page to allow the user to input the second sensitive information into the data entry page; and provide the second sensitive information to the first server via the respective data transfer channel; wherein the second server is configured to: identify the account of the user; retrieve the first sensitive information relating to the user using the identified account; and send the first sensitive information to the first server via the respective data transfer channel.

BRIEF DESCRIPTION OF THE DRAWINGS

Various features of the present disclosure will be apparent from the detailed description which follows, taken in conjunction with the accompanying drawings, which together illustrate, features of the present disclosure, and wherein.

DETAILED DESCRIPTION OF CERTAIN EMBODIMENTS

Figure 1:
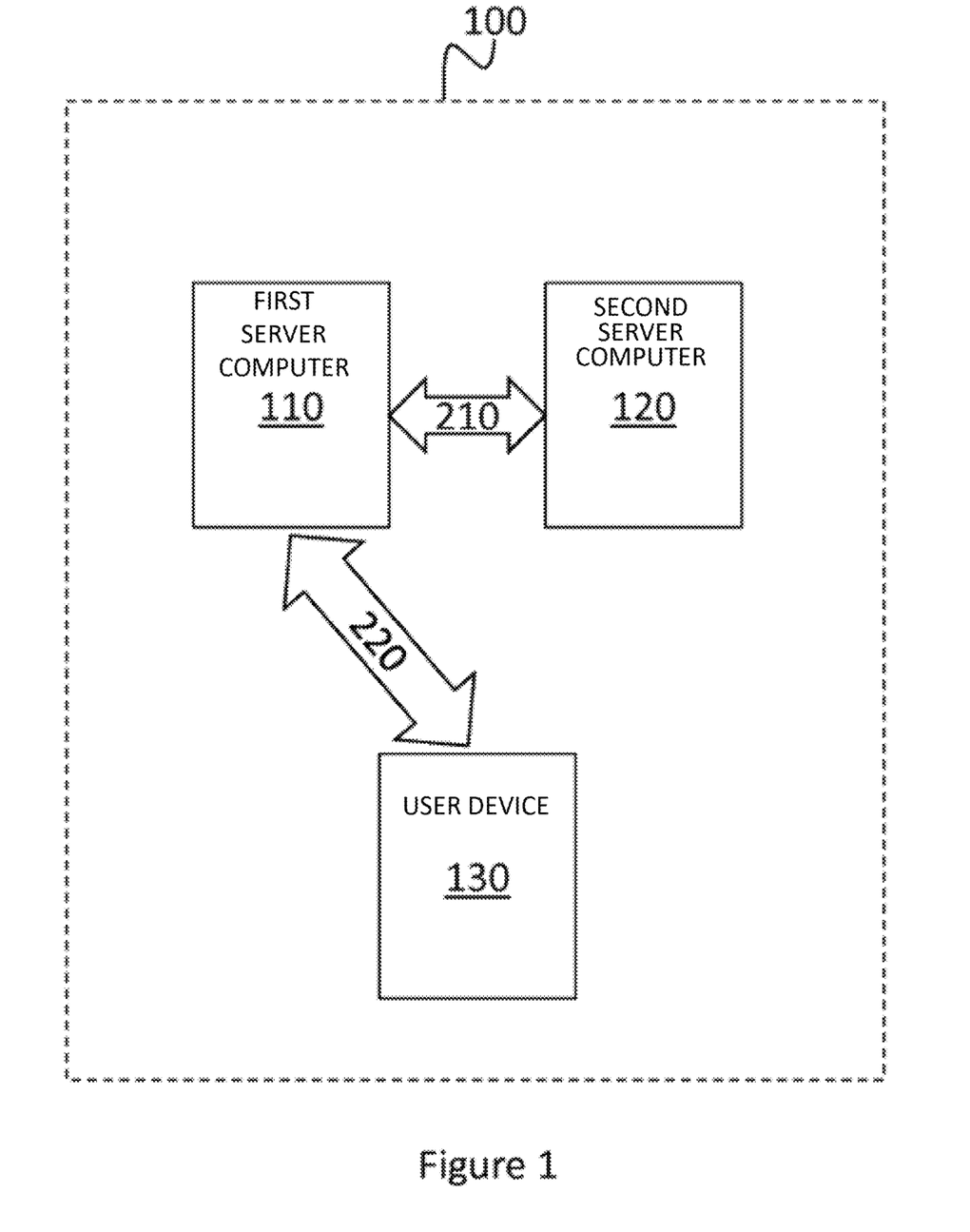
FIG. 1 is a schematic diagram of a transaction system, according to an example.

FIG. 1 shows a transaction system 100 to which embodiments described herein have particular applications.

The transaction system 100 comprises a first server computer 110, a second server computer 120 and a user device 130. The first server computer 110 and the second server computer 120 communicate via a first communication channel 210. The first server computer 110 and the user device 130 communicate via a second communication channel 220. In one example, the first server computer 110 and the second server computer 120 may receive, process, and maintain information relating to a user of the user device 130 and any transactions carried out using the same. The first and second communication channels 210, 220 may be communication channels across a network, such as the Internet or a private network.

The user device 130 may be a client computer associated with a user, a portable electronic device, such as a smartphone, a smartwatch, a wearable device, or a tablet computer. The user device 130 may execute a software application, such as an electronic mobile wallet application storing payment data relating to the user that enables the user to carry out transactions using the device.

Figure 2:
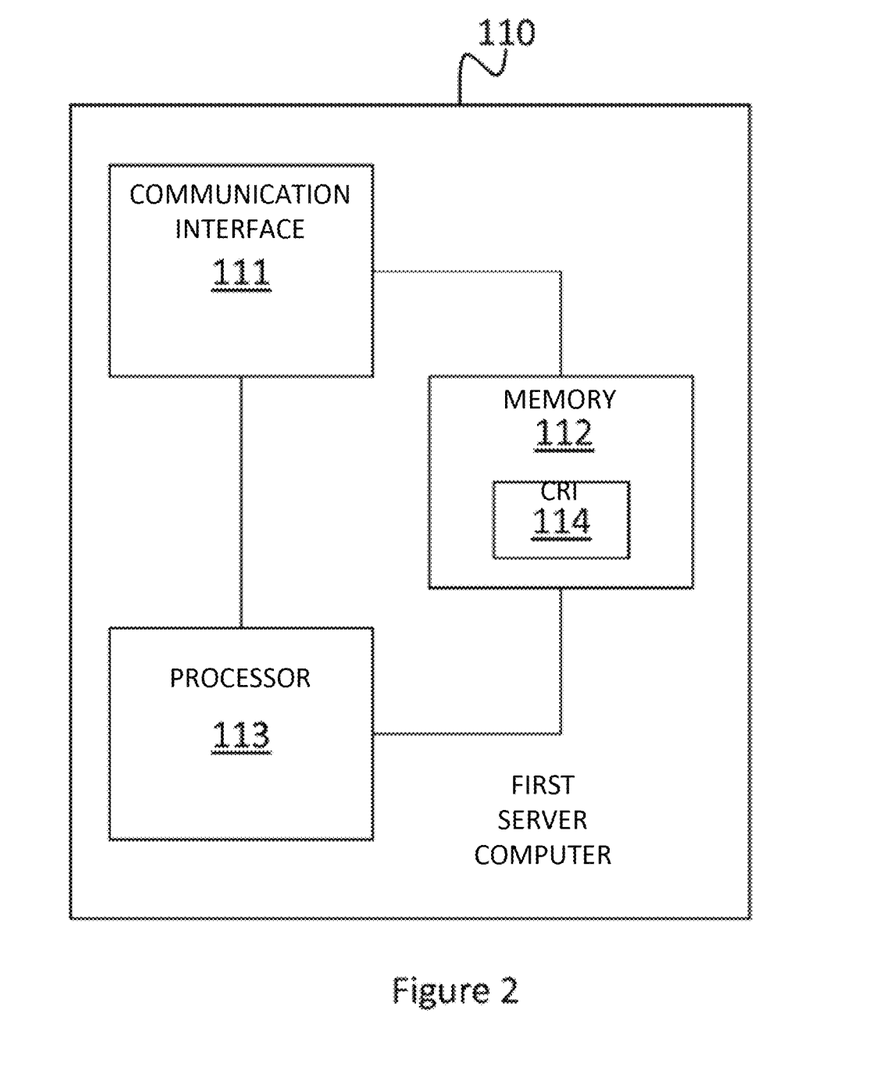
FIG. 2 is a schematic diagram of a first server computer, according to an example.

FIG. 2 shows the first server computer 110 to which embodiments described herein have particular applications. The first server computer 110 comprises a communication interface 111, a memory 112, and a processor 130. The communication interface 111 receives and transmits communications via the first and second communication channels 210 and 220 (FIG. 1) to thereby interact with the second server computer 120 and the user device 130. The communication interface 111 is coupled to the memory 112 and the processor 113 and forwards any received communications to the processor 113 via an internal bus (not shown). The memory 112 is coupled to the processor 113 and stores computer readable instructions 114 that are executable by the processor 113 to cause the first server computer 110 to perform one or more processes. As an example, the processor 113 may execute computer-readable instructions of one or more software applications.

Linking Data

In one example, a user associated with the user device 130 may have an account with the second server computer 120. For example, the second server computer 130 may provide a service to the user and maintain a record for the user, where the record contains sensitive information relating to the user. In one example, the sensitive information may be a user's name, address, date of birth, account identifier, and historical transaction data. In addition, a user associated with the user device 130 may have one or more other accounts with the first server computer 110. For instance, the first server computer 110 may host services that are accessible by the user device 130 and maintain a record per service for the user, where the record contains sensitive information relating to the user. In one example, the sensitive information may be payment information comprising payment card details (such as, a primary account number (PAN), a card identifier, digits from a card number and a card security code), payment account details of the user (such as, a bank name and an account number), and historical payment data for the user.

In one example, the system 100 may perform a data linking process for the user using the first and second communication channels 210, 220, described in more detail in relation to FIG. 3 below. As a result of such a data linking process, an association may be defined between different sensitive information of the user, originating from different sources, which can be utilized by other processes, described in more detail in relation to FIG. 6.

Figure 3:
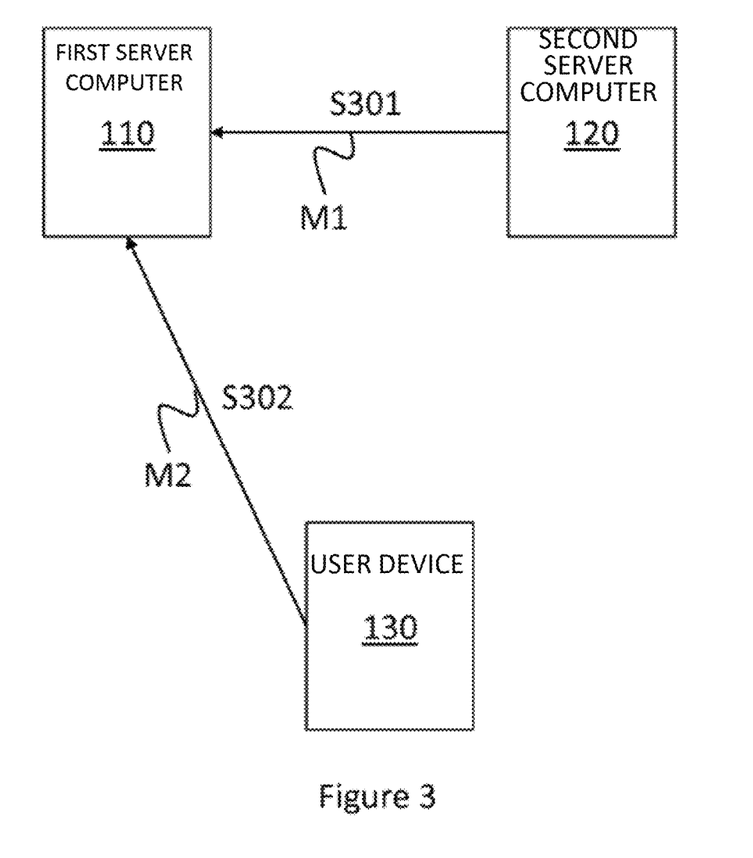
FIG. 3 is a schematic diagram of the transaction system of FIG. 1, according to an example.

FIG. 3 shows the system 100 of FIG. 1 and a flow of communications exchanged between the component parts of the system 100 as part of a data linking process, according to an example.

At step S301, the first server computer 110 receives a first message M1 containing first sensitive information from the second server computer 120. The first sensitive information relates to a user who has an account with the second server computer 120.

At step S302, the first server computer 110 receives a second message M2 containing second sensitive information from the user device 130. The second sensitive information is received via a data entry page hosted by the first server computer 110 and is communicated to the first server computer 110. The data entry page is configured to receive second sensitive data associated with the user. The second sensitive information is different to the first sensitive information. In one example, after receiving the second sensitive information, the first server computer 110 may validate the second sensitive information before the second sensitive information is associated with the first sensitive information.

In some examples, step S301 is be triggered by the user device 130 accessing a webpage hosted by the second server computer 120, for example, accessing a user account as a result of a user interacting with the user device 130 and navigating to their account using a web browser on the device 130. In some instances, step S130 may be triggered without user involvement, for example, by the user device 130 connecting to a network associated with the second server computer 120, for example, a Wi-Fi network.

After 302, the first server computer 110 associates the first sensitive information with the second sensitive information within a database (FIG. 7) that the first server computer 110 maintains. For example, the association of the first and second sensitive information may be the storing of the first and second information in with the same user identifier, the storing of both the first and second information within a single record maintained by the first server computer 110 and associated with the user, and the storing of the first and second sensitive information in separate records that include a pointer to one another. In each example, any future access request specifying a common user identifier, or identifying one of the first and second sensitive information, such as a read request, to the or each record could result in retrieval, or at least identification, of both the first and the second sensitive information.

In one example, after receiving the second sensitive information, the first server computer 110 may validate the second sensitive information before the second sensitive information is associated with the first sensitive information.

In one example, the process described in relation to FIG. 3 may be repeated in order to link further sensitive information with the first sensitive information in a many-to-one relationship.

The use of the different communication channels for sending respective sensitive information enables the different sensitive information to be securely received at a single location, first server computer 110, from different sources: in this example the second server computer 120 and the user device 130. In particular because (i) the first sensitive information is communicated directly to the first server computer 110 from the second server computer 120 and is not shared with the user device 130 and (ii) the second sensitive information is communicated directly to the first server computer 110 from the user device 130 and is not shared with the second server computer 120. Consequently, the number of separate communications containing sensitive information is reduced compared to a system that does not have two different and direct communication channels between a source of information and a target for the information. This increases the security and the efficiency of the system 100.

In addition, the amount of sensitive information per communication is reduced, which increases security because if any one communication is intercepted by an unauthorized third party only a single piece of sensitive information will be compromised.

Moreover, the association between the first and second sensitive information and the direct communication between the first and second server computer 110, 120 increases the efficiency of a process carried out by the second server computer 120 using the first sensitive information because the process is automatically initiated by another process carried out by the first server computer 110 using the second sensitive information, and vice versa. In addition, the association means there is no need to provide the first or second sensitive information to the first server computer 110 in order to initiate any subsequent processes using the respective information because the first server already stores the association and the first and second sensitive information.

Furthermore, the direct communication 210 between the second server computer 120 and the first server computer 110 has the effect that the user device 130 is not involved in generating the first sensitive information or providing the first sensitive information to the first server computer 110. In this way, the user device is not involved with the first sensitive information which: (i) eliminates the risk of erroneous input of the information at the user device 130 (so increases the reliability of information); and (ii) avoids storing the first sensitive information on the user device 130, for example a browser operating on the user device 130 may store such sensitive information within a browser history or web log, which are considered to be unsecure. In addition, the number of communications containing the first sensitive information is reduced, thus reducing the risk of interception of the first sensitive information.

Figure 4:
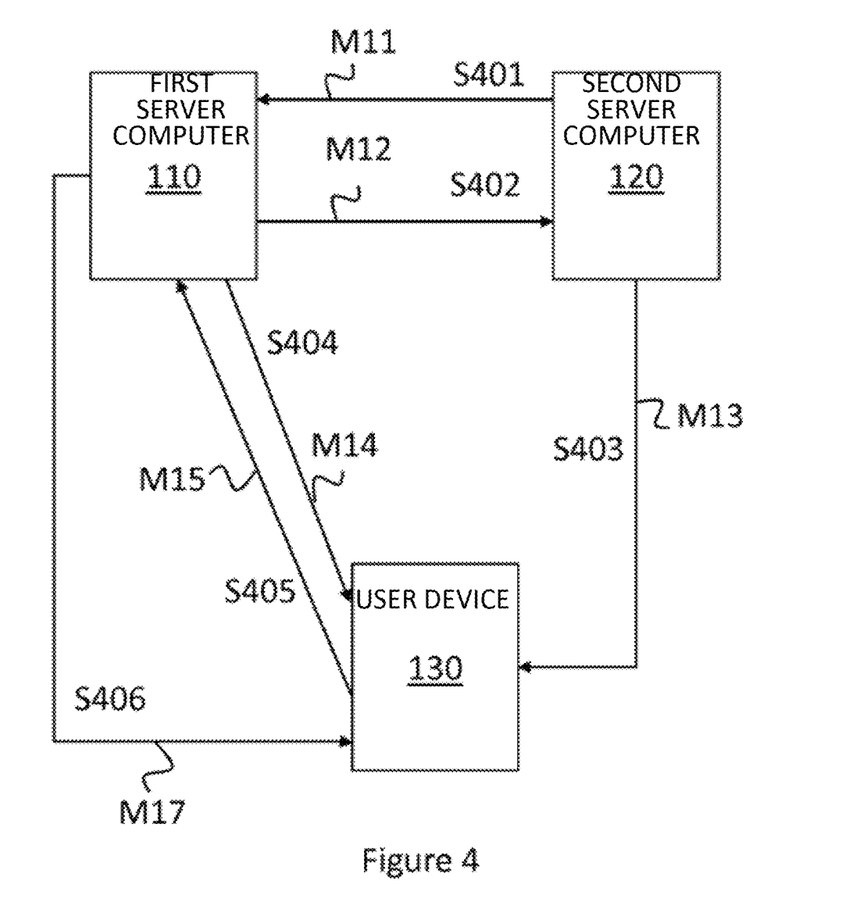
FIG. 4 is a schematic diagram of the transaction system of FIG. 1, according to an example.

FIG. 4 shows the system 100 of FIG. 1 and a flow of communications between the components parts of the system 100, according to an example. FIG. 4 provides further detail to the example of FIG. 3.

As for step S301, at step S401 the first server computer 110 receives a first message M11 comprising first sensitive information from the second server computer 120, where the first sensitive information relates to a user having an account with the second server computer 120. In one example, the second server computer 120 maintains a database comprising information relating to a plurality of users. Each of the users may have an account, such as an online account, with the second server computer 120, whereby the user has previously provided particular information to the second server computer 120 and is provided with a service, where the provided information is stored within a record of the database corresponding to their account. The second server computer 120 may store information relating to each user in corresponding record(s) of the database to facilitate access to an account of a user to obtain first sensitive information. In one example, the second server computer 120 may search its database using an identifier associated with a user in order to locate corresponding account information. The user device 130 may provide the identifier to the second server computer 120. In some examples, the message M11 also contains a re-direct URL, generated by the second server computer 120, and to be forwarded to the user device at a later point in time (step S406).

At step S402, the first server computer 110 generates and transmits a second message M12 comprising a session identifier to the second server computer 120. In some examples, the second message M12 may be embedded within a first token. The first token may be used as a replacement or substitute for the session identifier.

At step S403, the second server computer 120 generates a third message M13 that forwards the session identifier and a URL for a data entry page associated with the session identifier to the user device 130. The URL is generated by the second server computer 120 and is specific to the user of the user device 130 to allow the second server computer 120 to identify which user is the subject of any communication sent to the URL. The second server computer 120 may use the first token to provide the session identifier to the user device 130. For example, the session identifier may be embedded within or appended to the first token. The URL and the session identifier enable the user device to access the corresponding data entry page hosted by the first server computer 110 and to provide second sensitive information to the first server computer 110 via the data entry page.

At step S404, in response to receiving a request using the URL and the session identifier from the user device 130, the first server computer 110 may serve e.g. a web data entry page to a browser on the user device 130, included in a fourth message M14. In some examples, the data entry page is opened as an iFrame within the browser. In some examples, the first server computer 110 transmits a second token with the data entry page, where the first and second tokens are different. The second token may be used to submit data into the data entry page.

The use of first and second tokens provides another way of verifying the integrity of received data and thus enables an intercepted communication to be more easily identified if the token has been modified. In one example, the first and second tokens may be JSON web tokens (JWT) that are one-time use tokens and locked to a particular resource, which, in the example of FIG. 4, is the session identifier for the first token and is the submitted data for the second token. The JWT may be present in the header of a HTTPS request between the respective entities of the system 100 and used to verify the source of the data or message that the JWT accompanies. In one example the JWT is generated using an asymmetric algorithm, such as the RSA256 algorithm.

At step S405, the first server computer 110 receives a fifth message M15 that comprises the second token comprising the session identifier and the second sensitive information from the user device 130 via the data entry page. The session identifier provides a way for the user device 130 to identify to the first server computer 110 that the second sensitive information is sent by the user device 130. The first server computer 110 validates the second sensitive information, by, in some examples, forwarding the second sensitive information to an account validating entity.

After the second information is validated the first server computer 110 associates the second sensitive information with the first sensitive information.

At step S406, the first server computer 110 provides the re-direct URL to the user device 130 in a seventh message M17. The re-direct URL causes the browser of the user device 130 to automatically access a webpage associated with the second server computer 120 and identified by the re-direct URL.

In one example, the process described in relation to FIG. 4 may be repeated with other server computers in direct communication with the first server computer 110 so that the first server computer 110 links other sensitive information received from the respective other servers with the second sensitive information. As such, the second sensitive information may be linked with information provided by multiple sources and thus be in a many-to-one relationship. Consequently, an access request for the second sensitive information submitted to a database of the first server computer 110 could return some or all sensitive information previously associated with the second sensitive information by the first server computer 110.

Figure 5:
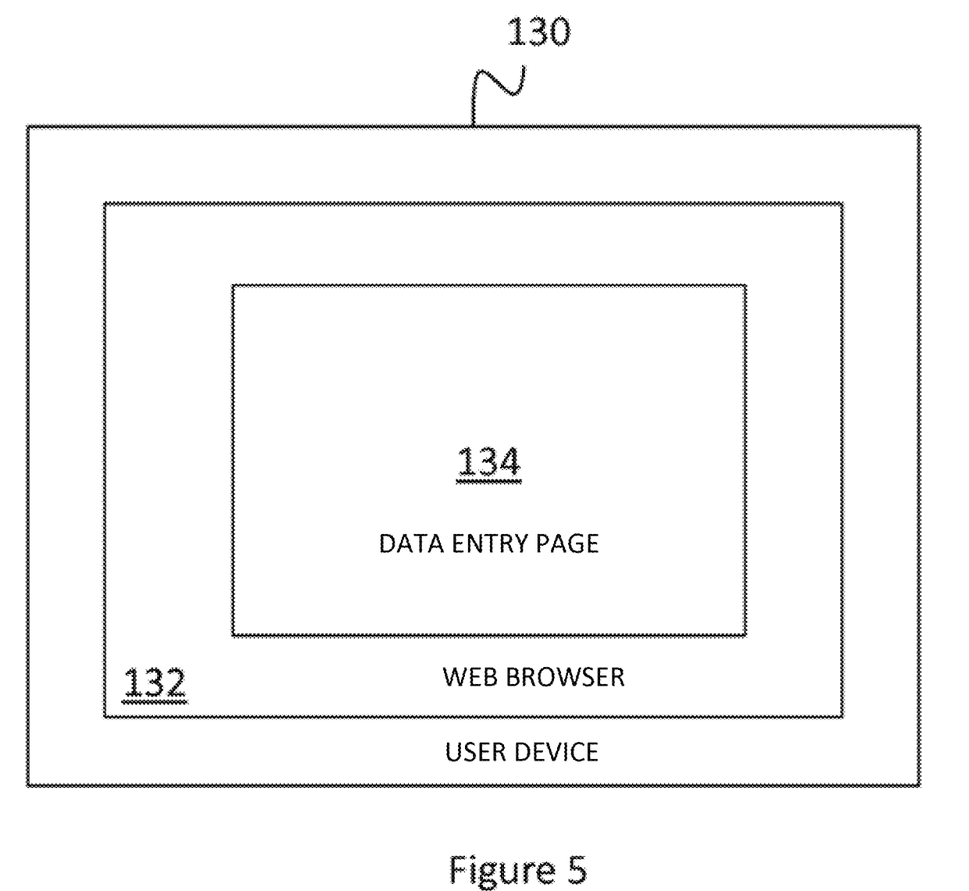
FIG. 5 is a schematic diagram of a user device, according to an example.

FIG. 5 shows the user device 130. The user device 130 may be running a web browser 132 that accesses a webpage hosted by the second server computer 120 to initiate a data linking process at step S401 of FIG. 4. The web browser 132 may also access a data entry page 134 hosted by the first server computer 110 at step S404 of FIG. 4. The web browser 132 accesses the data entry page 134 by providing a session identifier to the first server computer 110, where the session identifier was received from the first server computer 110 via the second server computer 120 at step S403 of FIG. 4. The web browser 132 may subsequently access a web page associated with the re-direct URL provided to the user device 130 at step S406 of FIG. 4.

Use Cases-Linked Data

In some examples, the linked or associated sensitive information maintained by the first server computer 110 may be an association between different sources, such as an electronic wallet application executing on a user device and a loyalty scheme account of a loyalty scheme provider, and used to process transactions involving the user device.

Figure 6:
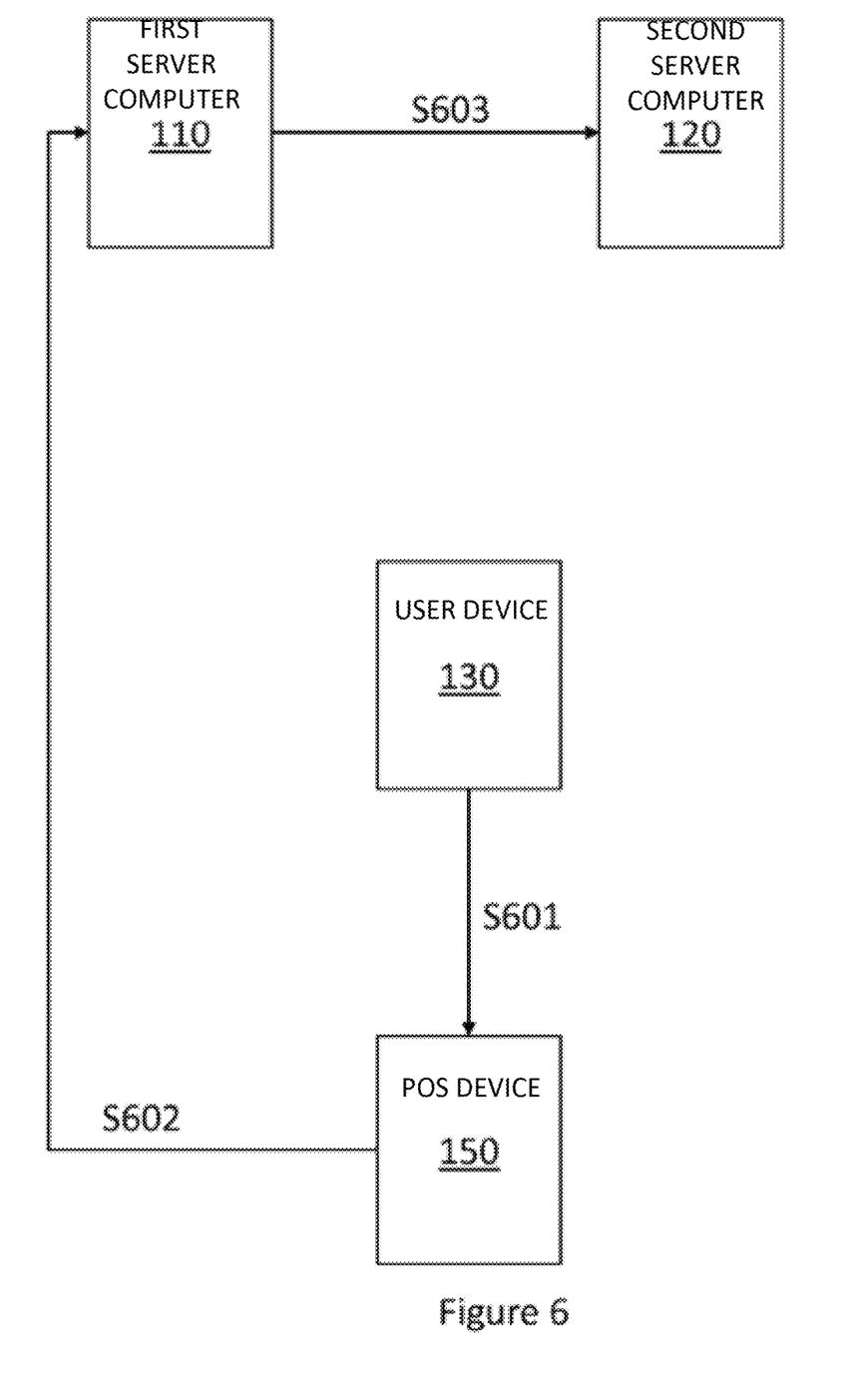
FIG. 6 is a schematic diagram of a transaction system, according to an example.

FIG. 6 shows the system 100 of FIG. 1 and a flow of communications transferred between the component parts of the system 100 as part of a process of using linked data, according to an example.

In this example system 100 is communicatively coupled to a merchant point-of-sale (POS) device 150. The POS device 150 is associated with a merchant that provides goods and/or services, or access thereto, to a user based on a transaction.

To initiate such a transaction, at step S601, the user device 130, such as a mobile phone executing an electronic wallet application, provides sensitive information to the POS device 150. In one example, the sensitive information comprises payment card details or details of a payment account. At step S602, the POS device 150 communicates the sensitive information and corresponding transaction data to the first server computer 110. In one example, the corresponding transaction data comprises a transaction amount. In one example, the POS device 150 is in communication with another computing entity that processes the payment and/or transaction data before forwarding it on to the first server computer 110.

The first server computer 110 maintains a database 700 (FIG. 7) containing sensitive information for a plurality of users that each have an account with the first server computer 110.

Figure 7:
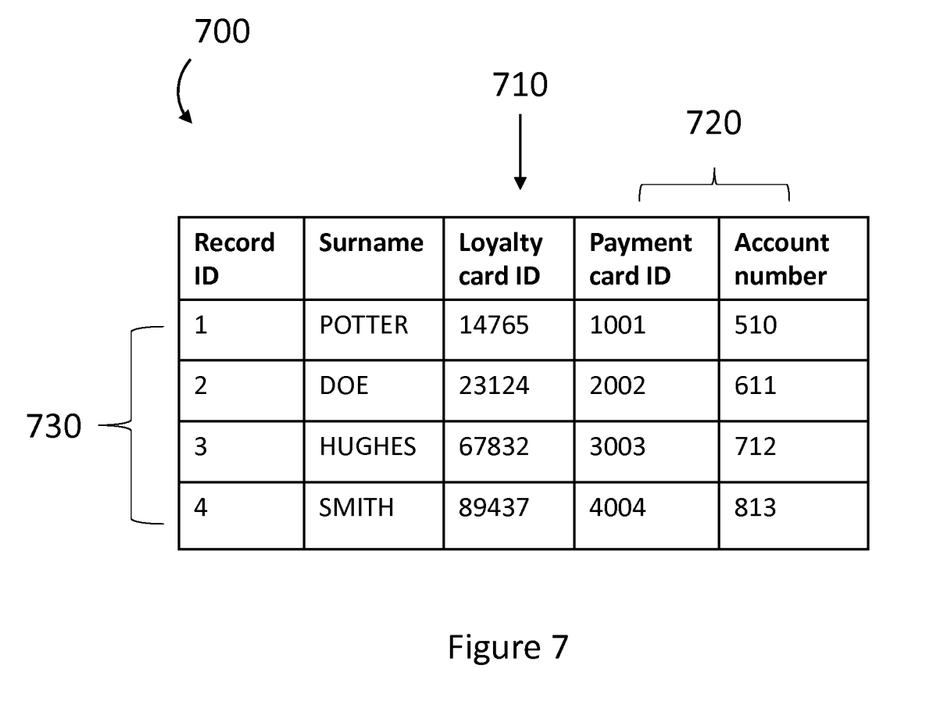
FIG. 7 is a schematic representation of a database stored by a first server computer, according to an example.

In the example of FIG. 7, the database 700 has five columns: Record ID; Surname; Loyalty card ID, Payment card ID; and Account number, and maintains a plurality of records 730, each corresponding to a respective user. The loyalty card ID column contains the first sensitive information 710 previously provided to the first server computer 110 by the second server computer 120 as part of a data linking process (described in relation to FIGS. 1-5). The Payment card ID and the Account number columns contain the second sensitive information 720 previously provided to the first server computer 110 by the user device 130 as part of the data linking process (described in relation to FIGS. 1-5).

Based on the sensitive information received at step S601, such as payment card details or details of a payment account, the first server computer 110 identifies a record of the plurality of records in the database 700 associated with the user device 130. In this example, the sensitive information comprises a payment card identifier "3003". Accordingly, the identifier "3003" is used as the basis for a search within the database 700. A search based on "3003" would identify the record with record ID "3" in the database 700. The first server computer 110 proceeds to retrieve other sensitive information, such as the loyalty card ID number "67832", that was previously associated with the received sensitive information "3003" in a data linking process from the identified record "3", where at least some of the other sensitive information was previously provided by the second server computer 120 in accordance with steps 301 and 401 described above.

Returning to FIG. 6, at step S603, the first server computer 110 communicates the transaction data and at least some of the sensitive information, including at least the loyalty card ID "67832" within the identified record "3" to the second server computer 120 with which the user of the user device 130 has an account. The second server computer 120 identifies the user's account using the loyalty card ID "67832" and updates the user's account based on the transaction data.

In some examples, after step S603, the second server computer 120 sends a communication to the user device 130 notifying the user that their account with the second server computer 120 has been updated based on the transaction.

In other examples, the first server computer 110 may be queried, for example by the second server computer 120, to retrieve details of the association between an account maintained by the second server computer 120 and one or more maintained by the first server computer 110.

Implementation Examples

The system 100 described in relation to FIGS. 1-7 may have particular application in a transaction system where the first server computer 110 is a payment processing server and the second server computer 120 is a loyalty scheme server. The payment processing server 110 may comprise a transaction service provider and/or an issuer server, or be in communication therewith, to process transaction and payment data to enable a transaction between a user and a merchant to be authorized and completed. The loyalty scheme server 120 maintains loyalty accounts for a plurality of users and updates the status of each account based on and in response to transactions that the respective users carry out at merchant locations, for example, at a merchant's POS device, which may be in a store or implemented as software on the merchant's website. As such, the loyalty scheme server 120 and the payment processing server 130 have a shared interest in user transactions.

As described above, different sensitive information relating to a user and received from different sources may be linked or associated with one another. In the aforementioned transaction system example, the payment processing server 110 receives sensitive information relating to a user from the loyalty scheme server 120 (for example, a loyalty scheme identifier) and the user device 130 (for example, payment card details) and defines an association between the two and thus, a user's loyalty account, for which a user may have a physical or an electronic loyalty account card, and a user's payment account, for which the user may have a physical or an electronic payment card. Accordingly, the association between the user's loyalty account and the user's payment account would be understood to be an association between the user's loyalty account card and the user's payment account card. In one example, a user may link multiple payment cards to a single loyalty account card by repeating the methods described in relation to FIGS. 3 and 4. In such a scenario, in the example of FIG. 7 the database would contain a single "Loyalty card ID" column and multiple "Payment card ID" columns, such as "1$^{st}$ Payment card ID", "2nd Payment card ID", etc.

As described in relation to FIGS. 6 and 7, based on an association between different sensitive information relating to a single user, transaction data may be monitored and passed directly from the payment processing server 110 to the loyalty scheme server 120 so that a user account maintained by the loyalty scheme server 120 can be updated, without requiring user intervention or further communications with the user device 130, when the payment processing server 110 is processing a transaction. For instance, the user is not required to separately interact with the merchant's POS device 150 using their loyalty account card and their payment account card. Rather, a single interaction between the POS device 150 and the user's payment account card facilitates the updating of the user's loyalty account, which simplifies the transaction system 100 and interactions thereof, as described above.

The transaction data may be sent to the loyalty scheme provider 120 with the sensitive information (for example, the loyalty account identifier or a corresponding loyalty card number) previously received by the loyalty scheme server 120 to enable the loyalty scheme provider 120 to identify the relevant user account. The transaction data may include one or more of the following: a unique payment account or card identifier; an authentication code; a transaction identifier; a transaction amount; a transaction currency; a transaction date and time; a merchant descriptor name; and a merchant identifier.

The loyalty scheme server 120 analyses the transaction data to determine any updates to be made to a corresponding user account. This analysis may comprise comparing the transaction data to data relating to the merchant, either stored by the loyalty scheme server 120, or provided by the merchant's POS device 150, to determine the eligibility of the transaction data for being the basis on which an update to a user's loyalty account is made.

In one example, the loyalty scheme provider may update a user account by incrementing a counter value based on received transaction data. For instance, a number of points may be awarded to a user's loyalty account based on a monetary value of a transaction.

Fewer communications are used within the transaction system 100 and thus, less sensitive information is communicated within the system, which means the loyalty scheme server 120, and the transaction system 100 as a whole, operates in a much more efficient and secure way. In addition, in some examples the loyalty scheme server 120 may not comply with the Payment Card Industry Data Security Standard (PCI DSS), and thus may be referred to as being outside "PCI scope". Accordingly, the transaction system 100 enables the loyalty scheme server 120 to receive details on transactions from the payment processing server 110 without needing to become PCI compliant.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method comprising:
   receiving, by a first server from a second server, first sensitive information relating to a user having an account with the second server;
   in response to receiving the first sensitive information, transmitting, by the first server to the second server, a session identifier and a first Web token, wherein the second server forwards the session identifier to a user device so that the user device can access a data entry page;
   providing, by the first server to the user device, a second Web token and the data entry page, wherein the second Web token is used to provide second sensitive information to the first server;
   receiving, by the first server from the user device, the second sensitive information via the data entry page and the session identifier, wherein the second sensitive information is different to the first sensitive information; and
   associating, by the first server, the first sensitive information with the second sensitive information; and
   wherein the first server and the second server communicate via a first communication channel and the first server and the user device communicate via a second, different communication channel.

2. The computer-implemented method of claim 1, wherein the first and second Web tokens are different Web tokens.

3. The computer-implemented method of claim 1, further comprising:
   receiving, by the first server from the second server, a re-direct URL; and
   providing, by the first server to the user device, the re-direct URL, such that a browser of the user device automatically accesses a resource associated with the second server using the re-direct URL after the second sensitive information has been inputted to the data entry page.

4. The computer-implemented method of claim 1, further comprising:
   accessing, by the second server, the account of the user; and
   obtaining the first sensitive information.

5. The computer-implemented method of claim 1, further comprising:
   receiving, by the second server, an identifier of the user, wherein the identifier is associated with the account of the user.

6. A server computer comprising:
a processor; and
a computer readable medium configured to store executable instructions,
wherein the server computer is configured to communicate with a user device and a second server computer, and the processor is configured to execute the stored executable instructions to:
receive, from the second server computer via a first communication channel, first sensitive information relating to a user having an account with the second server computer;
in response to receiving the first sensitive information, transmit, to the second server computer, a session identifier and a first Web token, wherein the second server forwards the session identifier to the user device so that the user device can access a data entry page;
provide, to the user device, a second Web token and the data entry page, wherein the second Web token is used to provide second sensitive information to the server computer;
receive, from the user device, the second sensitive information via the data entry page and the session identifier, wherein the second sensitive information is different to the first sensitive information
wherein the second sensitive information is received via the data entry page and a second, different, communication channel; and
associate the first sensitive information with the second sensitive information.

7. The server computer of claim 6, configured to:
host the data entry page accessible by the user device and configured to receive the second sensitive information.

8. The server computer of claim 6, wherein the first and second Web tokens are different Web tokens.

9. The server computer of claim 6, wherein the processor is configured to execute the stored executable instructions to:
receive, from the second server computer via the first communication channel, a re-direct URL; and
provide, to the user device via the second, different, communication channel, the re-direct URL, such that a browser of the user device automatically accesses a resource associated with the second server computer using the re-direct URL after the second sensitive information has been inputted to the data entry page.

10. A system comprising a client computer, a first server and a second server, wherein the first server comprises a first processor, and a first non-transitory computer readable medium comprising code, executable by the first processor to:
interact with the second server and the client computer via respective data transfer channels;
receive, from the second server via the respective data transfer channel, first sensitive information relating to a user having an account with the second server and associated with the client computer;
in response to receiving the first sensitive information, transmit, to the second server, a session identifier and a first Web token, wherein the second server forwards the session identifier to the client computer so that the client computer can access a data entry page;
provide, to the client computer, a second Web token and the data entry page accessible by the client computer, wherein the second Web token is used to provide second sensitive information to the first server;
provide the data entry page accessible by the client computer;
receive, from the client computer via the respective data transfer channel, the second sensitive information associated with the user via the data entry page and the session identifier, wherein the second sensitive information is different to the first sensitive information; and
link the first sensitive information with the second sensitive information;
wherein the client computer comprises a third processor, and a third non-transitory computer readable medium comprising code, executable by the third processor to:
access the data entry page to allow the user to input the second sensitive information into the data entry page; and
provide the second sensitive information to the first server via the respective data transfer channel;
wherein the second server comprises a second processor, and a second non-transitory computer readable medium comprising code, executable by the second processor to:
identify the account of the user;
retrieve the first sensitive information relating to the user using the identified account; and
send the first sensitive information to the first server via the respective data transfer channel.

11. The system of claim 10, wherein:
the client computer is configured to:
use the second Web token to provide the second sensitive information to the first server.

12. The method of claim 1, wherein the first sensitive information comprises a loyalty card identifier.

13. The method of claim 1, wherein the second sensitive information comprises a payment card identifier.

14. The method of claim 12, wherein the first sensitive information comprises a loyalty card number.

15. The method of claim 1, wherein the first server has a database storing a first column including a plurality of first sensitive information including the first sensitive information, a second column including a plurality of second sensitive information including the second sensitive information.

16. The method of claim 15, wherein the database further comprises a third column comprising a plurality of names corresponding to the plurality of first sensitive information and the plurality of second sensitive information.

17. The method of claim 15, wherein the first Web token and the second Web token are JSON Web tokens.

* * * * *